(12) United States Patent
Evans et al.

(10) Patent No.: US 9,869,085 B2
(45) Date of Patent: Jan. 16, 2018

(54) BRACKET ASSEMBLY AND METHOD

(71) Applicants: Shaun Evans, Auckland (NZ); Scott Simpson, Auckland (NZ)

(72) Inventors: Shaun Evans, Auckland (NZ); Scott Simpson, Auckland (NZ)

( * ) Notice: Subject to any disclaimer, the term of this patent is extended or adjusted under 35 U.S.C. 154(b) by 0 days.

(21) Appl. No.: 15/028,498

(22) PCT Filed: Oct. 8, 2014

(86) PCT No.: PCT/NZ2014/050002
§ 371 (c)(1),
(2) Date: Apr. 11, 2016

(87) PCT Pub. No.: WO2015/053639
PCT Pub. Date: Apr. 16, 2015

(65) Prior Publication Data
US 2016/0251845 A1    Sep. 1, 2016

(30) Foreign Application Priority Data

Oct. 11, 2013  (NZ) ......................................... 616564
Nov. 18, 2013  (NZ) ......................................... 617879

(51) Int. Cl.
*E04B 1/41* (2006.01)
*E04B 2/82* (2006.01)
(Continued)

(52) U.S. Cl.
CPC .................. *E04B 1/40* (2013.01); *E04B 2/82* (2013.01); *F16M 13/027* (2013.01); *E04B 2001/405* (2013.01)

(58) Field of Classification Search
CPC ........ E04B 1/40; E04B 2/82; E04B 2001/405; E04B 9/30; F16M 13/027; E04F 13/0803
(Continued)

(56) References Cited

U.S. PATENT DOCUMENTS 2,910,738 A * 11/1959 McCorkell .............. E04B 9/008
                                                        52/220.6
3,067,323 A * 12/1962 Kember .................. E04B 9/006
                                                        362/150

(Continued)

OTHER PUBLICATIONS

International Search Report PCT/NZ2014/050002 dated Jan. 20, 2015.

*Primary Examiner* — Brian Glessner
*Assistant Examiner* — Adam Barlow
(74) *Attorney, Agent, or Firm* — Young & Thompson

(57) ABSTRACT

A bracket assembly for connecting an overhead roof structure to below roof structure elements of a building. The below roof structure elements include a wall having a top plate member or ceiling support structure. The bracket assembly includes overhead fixing members, a bracket member, bearing member, sleeve member, and below roof structure fastener, which are interconnected and fastened together. One end of the bracket member is connectable to the overhead fixing members to the overhead roof structure and the other end is connectable to the below roof structure fastener which is connectable to the below roof structure. The bearing and sleeve members are located and connected between the bracket member and the below roof structure such that the bracket member rests without loading on the bearing member which then rests on the sleeve member which when used rests without loading on the below roof structure, providing structural integrity.

21 Claims, 14 Drawing Sheets

(51) Int. Cl.
*F16M 13/02* (2006.01)
*E04B 1/38* (2006.01)

(58) Field of Classification Search
USPC .............. 52/506.05, 506.06, 509, 512, 698
See application file for complete search history.

(56) References Cited

U.S. PATENT DOCUMENTS

| | | | | |
|---|---|---|---|---|
| 4,081,931 A | * | 4/1978 | Miyoshi | E04B 9/366 52/39 |
| 4,127,252 A | * | 11/1978 | Splawn | G12B 9/08 248/333 |
| 4,545,166 A | * | 10/1985 | Kielmeyer | E04B 9/064 52/506.06 |
| 5,165,647 A | * | 11/1992 | Ribeiro | A61M 5/1415 248/323 |
| 7,096,633 B1 | * | 8/2006 | Bowen | E04B 9/064 52/476 |
| 7,316,380 B2 | * | 1/2008 | Arakawa | A47F 5/0006 24/136 A |
| 7,673,429 B2 | | 3/2010 | Frecska | |
| 8,146,299 B2 | | 4/2012 | Stearns et al. | |
| 8,555,577 B2 | * | 10/2013 | Maday | E04B 2/00 52/235 |
| 8,561,366 B2 | * | 10/2013 | Gasperi | E04B 1/4107 52/235 |
| 8,733,037 B2 | * | 5/2014 | Bindschedler | E04D 11/007 52/126.5 |
| 9,431,953 B2 | * | 8/2016 | Stearns | H02S 20/23 |
| 2009/0146020 A1 | * | 6/2009 | Moore | F16M 13/027 248/68.1 |
| 2010/0077686 A1 | * | 4/2010 | Bowen | E04B 9/303 52/506.06 |
| 2010/0077688 A1 | * | 4/2010 | Bowen | E04B 9/303 52/506.09 |
| 2011/0179727 A1 | | 7/2011 | Liu | |
| 2011/0309041 A1 | * | 12/2011 | Amadio | F16M 11/10 211/26 |
| 2016/0251845 A1 | * | 9/2016 | Evans | E04B 2/82 52/698 |

* cited by examiner

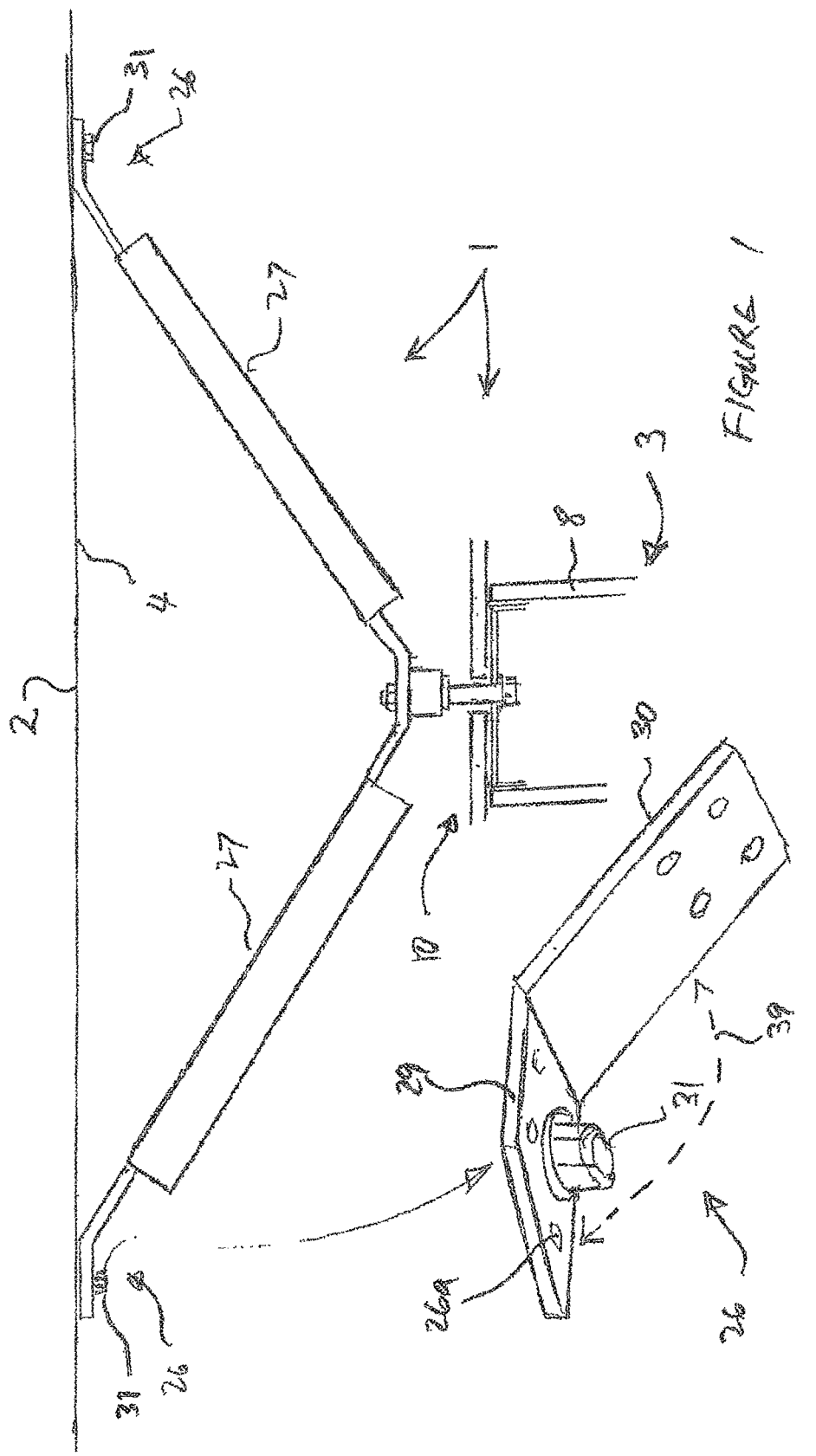

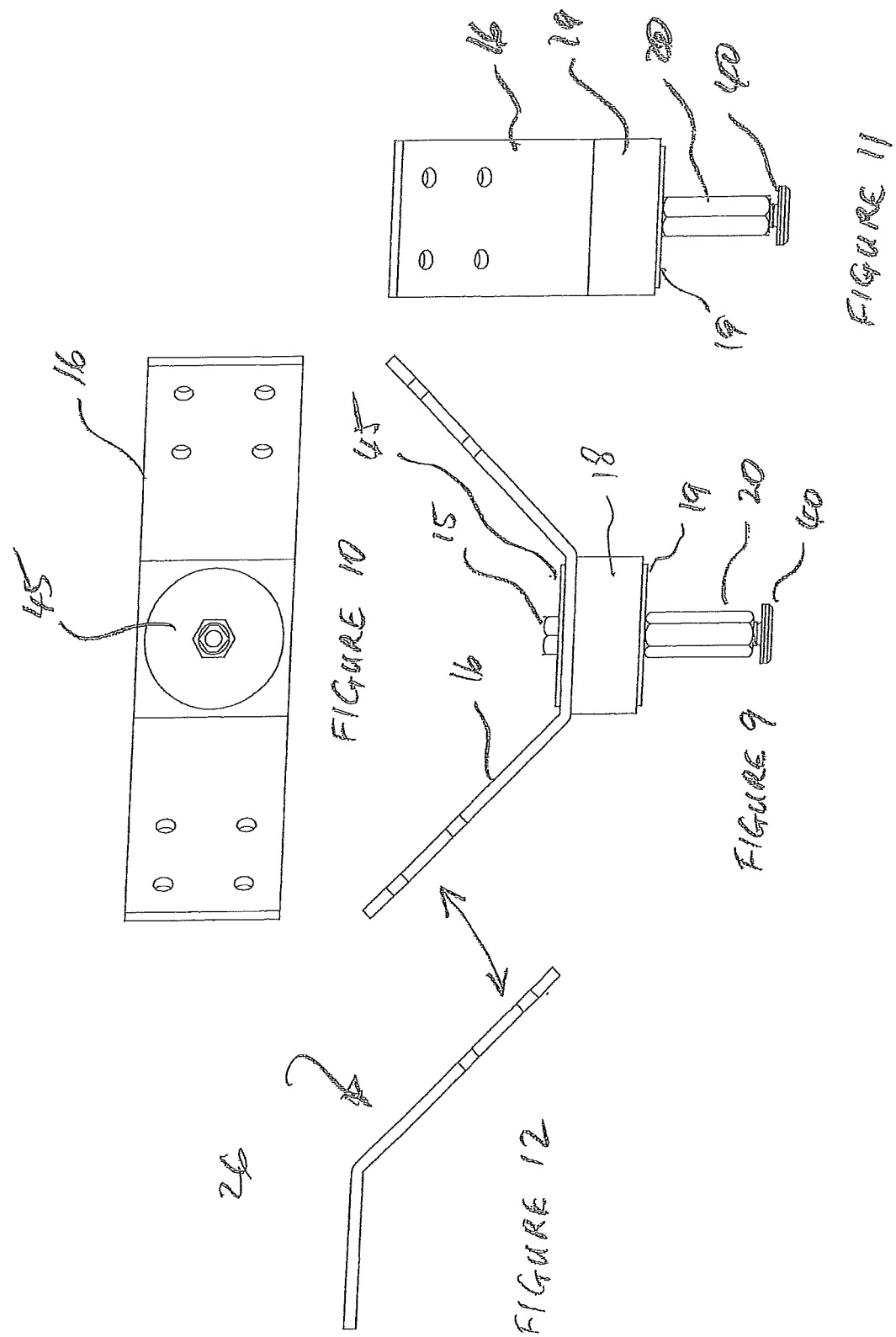

BRACKET ASSEMBLY AND METHOD

The invention relates to a bracket assembly for providing positive connection between parts of a building and to a method of installation. The invention is directed particularly but not solely towards connection to walls or ceiling structures to overhead structures but to any upright wall or ceiling structures to overhead structures to provide structural integrity to a building in response to any extreme events.

BACKGROUND OF INVENTION

Connections of elements of a building structure including the top of a partition or wall structure to an overhead structure like for example a roof structure can be very important in seismic events or any event where the building is subject to external forces beyond normal day to day use. Ceiling structures include a metal grid frame which is hung by cable or wire from roof structure with the grid supporting ceiling tiles which may rest or locate on top of the wall structure but not transfer any significant loading thereon. However the grid and ceiling tiles are not held rigidly to the roof structure and so are able to sway or move very easily if the roof structure moves.

Therefore it is desirable from a point of view of reducing injury or loss of life, to enable any building or components of a building to hold together for as long as possible so to not collapse straight away on top of people while allowing safe evacuation.

Some existing methods of connecting the roof structure to a wall partition usually involve simply attaching fasteners like nails or bolts through the ceiling or roof structure to the top of a wall partition. Attaching such fasteners is awkward and not very effective in providing good positive fastening to both structures. Yet other methods involve cutting existing bracing structures to attach to walls and roof structures for different angles or distances which in it self can cause structural weakness to the bracing structure.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein; this reference does not constitute an admission that any of these documents form part of the common general knowledge in the art, in New Zealand or in any other country.

OBJECT OF THE INVENTION

It is an object of the invention to provide bracket assembly and method of installation that ameliorates some of the disadvantages and limitations of the known art or at least provide the public with a useful choice.

SUMMARY OF INVENTION

In a first aspect the invention resides in a bracket assembly for connecting or linking an overhead roof structure to below roof structure elements of a building, the below roof structure elements including a wall having a top plate member or ceiling support structure, the bracket assembly comprising overhead fixing members, a bracket member, bearing member, sleeve member, and below roof structure fastener, being interconnected and fastened together wherein one end of the bracket member is connectable to the overhead fixing members to the overhead roof structure and the other end of the bracket member is connectable to below roof structure fastener which is connectable to the below roof structure, with the bearing member and sleeve member being located and connected between the bracket member and the below roof structure such that the bracket member rests without loading on the bearing member which then rests on the sleeve member which when in use rests without loading on the below roof structure, being adapted to provide structural integrity between the below roof structure and overhead structure.

Preferably the below roof structure includes a wall having a top plate member.

Preferably, the sleeve member spaces the bearing member from the top plate member.

Preferably the bracket member is a truncated V shape in cross section.

Preferably at least one fastener is applied from a top of the bracket member to connect to the top plate member to hold and connect in between, a bracket member, bearing member, washer, and sleeve member.

Preferably the at least one fastener abuts a mounting plinth member having a central raised portion with a central aperture and an outer periphery mounting portion whereby a lower end of the sleeve rests on the central raised portion and the periphery portion is fastened to the top plate member.

Alternatively there are upper and lower fasteners whereby the upper fastener connects the bracket member to the bearing member and sleeve member, and the lower fastener connects the sleeve member to the top plate member.

Preferably the sleeve member is an elongate member having a length with ends and width wherein the width is selected to be less than a diameter of a hole made through the ceiling tile but greater than the diameter of a hole through the top plate member wherein the sleeve member is hollow having an internal thread to allow the upper and lower fasteners to connect therein at each end.

Preferably the overhead fixing members are connected to link members 27, which are connected to the bracket member wherein the link members are elongate members having a length and width and the overhead fixing members have a foot portion and angled portion wherein the foot portion is fixable to the overhead structure and the angled portion is attachable to the link member.

Preferably the link member includes adjustment means to allow the length of link member to be varied and the assembly includes two overhead fixing members and two link members.

Preferably the link member has a shape selected from a solid timber member, angle member or box section and the upper and lower fastening means include bolt members.

Preferably the bracket and overhead fixing members are formed of elongate plate like members.

Alternatively, the below roof structure includes a ceiling support structure having a ceiling grid support frame suspended from the overhead roof structure with ceiling tiles supported on or by the ceiling grid support frame.

Preferably, the sleeve member spaces the bearing member from the below roof structure fastener and below roof structure.

Preferably the bracket member comprises a truncated V shape body in cross section wherein there are two bodies forming a cross shape in plan view.

Preferably at least one fastener is applied from a top of the bracket member to connect to the below roof structure fastener to hold and connect in between, a bracket member, bearing member, washer, and sleeve member.

Preferably the below roof structure fastener includes a grid connecting member having a body comprising an elongate member having a U shaped cross section with side walls, sized and adapted to downwardly slide over at least a portion of a ceiling grid support frame and be fastened thereto through the side walls and to part of the ceiling grid support frame.

Preferably the body of the below roof structure fastener is shaped as a cross shaped member forming a central point with aperture for the fastener to be inserted there through to fasten the below roof structure fastener to the rest of the bracket assembly.

Preferably the sleeve member is an upright elongate member having a length with ends and width wherein the width is selected to be greater than the diameter of a hole through the below roof structure wherein the sleeve member is hollow having an internal thread to allow upper and lower fasteners to connect therein at each end.

Preferably the overhead fixing members are connected to link members 27, which are connected to the bracket member wherein the link members are elongate members having a length and width and the overhead fixing members have a foot portion and angled portion wherein the foot portion is fixable to the overhead structure and the angled portion is attachable to the link member.

Preferably the link member includes adjustment means to allow the length of link member to be varied and the assembly includes two overhead fixing members and two link members.

Preferably the link member has a shape selected from a solid timber member, angle member or box section.

In a second aspect the invention resides in a bracket assembly for connecting or linking a roof structure to other elements of a building including a wall having a top plate member, the bracket assembly comprising a bracket member, bearing member, sleeve member, overhead fixing members being interconnected together wherein one end of the bracket member is connectable to the overhead fixing members to the overhead structure and the other end of the bracket member is connectable to the top plate member of a wall, with the bearing member and sleeve member being located and connected between the bracket and the top plate member such that the bracket member rests without loading on the bearing member which then rests on the sleeve member which when in use rests without loading on the top plate member, being adapted to provide structural integrity between the wall and overhead structure and to not be connected to a ceiling structure.

Preferably the bracket member is a truncated V shape in cross section.

Preferably, the sleeve member spaces the bearing member from the top plate member.

Preferably at least one fastener is applied from a top of the assembly to connect to the top plate member to hold and connect in between, a bracket member, bearing member, washer, and sleeve member.

Preferably the at least one fastener abuts a mounting plinth member having a central raised portion with a central aperture and an outer periphery mounting portion whereby a lower end of the sleeve rests on the central raised portion and the periphery portion is fastened to the top plate member.

Preferably there are upper and lower fasteners whereby the upper fastener connects the bracket member to the bearing member and sleeve member, and the lower fastener connects the sleeve member to the top plate member.

Preferably the sleeve member is an upright elongate member having a length with ends and width wherein the width is selected to be less than a diameter of a hole made through the ceiling tile but greater than the diameter of a hole through the top plate member wherein the sleeve member is hollow having an internal thread to allow the upper and lower fasteners to connect therein at each end.

Preferably the overhead fixing members are connected to link members 27, which are connected to the bracket member wherein the link members are elongate members having a length and width and the overhead fixing members have a foot portion and angled portion wherein the foot portion is fixable to the overhead structure and the angled portion is attachable to the link member.

Preferably the link member includes adjustment means to allow the length of link member to be varied and the assembly includes two overhead fixing members and two link members.

Preferably the link member has a shape selected from a solid timber member, angle member or box section.

Preferably the upper and lower fastening means include bolt members and the bracket and overhead fixing members are formed of elongate plate like members.

In a third aspect the invention resides in a method of installing or linking a wall to overhead structure with a bracket assembly as disclosed in the second aspect, comprising the following steps of:

drilling hole in ceiling tile 13 of one diameter and another hole of a smaller diameter in top plate member 7 to ensure the assembly does not contact a ceiling structure;

upwardly inserting lower fastener 24 with spring washer 22 to protrude there from the ceiling tile 13;

sliding down sleeve member 20 onto top of top plate member 7;

screw lower fastener 24 into sleeve member 20;

sliding upper fastener 15 downwardly through middle portion 27 of bracket 16;

upwardly sliding bearing member 18 to fastener to abut underside of middle portion 27;

upwardly sliding washer 19 onto upper fastener 15 abutting the bearing member 18;

screw upper fastener 15 downwardly into protruding end of sleeve member 20;

drilling and fastening foot 29 of overhead fixing members 26 to overhead structure 2 attaching link member 27 to angled portion 30 and to wing members 28.

In a fourth aspect the invention resides in a method of installing or linking a wall to overhead structure with a bracket assembly as disclosed in the second aspect, comprising the following steps of:

drill hole in ceiling tile 13 of one diameter and another hole of a smaller diameter in top plate member 7 to ensure the assembly does not contact a ceiling structure 10;

arrange sleeve member 20 downwardly into the one diameter, followed by washer 19, followed by bearing member 18 followed by the bracket 16;

insert and screw, a screw downwardly to attach to top plate member 7;

drill and fasten foot 29 of overhead fixing members 26 to overhead structure 2 attach link member 27 to angled portion 30 and to wing members 28.

In a fifth aspect the invention resides in a bracket assembly for connecting a roof structure to other elements of a building including a ceiling structure comprising a ceiling grid supporting ceiling tiles, the bracket assembly comprising overhead fixing members, a bracket member, bearing member, sleeve member and ceiling grid connecting member, being interconnected together wherein one end of the bracket member is connectable to the overhead fixing members which are connected to the overhead structure and the other end of the bracket member is connectable to the ceiling grid connecting member, with the bearing member and sleeve member being located and connected between the bracket and the ceiling grid connecting member such that the bracket member rests without loading on the bearing member which then rests on the sleeve member which when in use rests without loading on the ceiling grid connecting member, being adapted to provide structural integrity between the ceiling structure and overhead structure and to not be connected to a wall structure.

Preferably the bracket member is a truncated V shape in cross section.

Preferably, the sleeve member spaces the bearing member from the grid connection member.

Preferably ceiling grid connecting member is a body shaped as a cross, with a U shaped cross section with side walls, whereby fasteners can be attached through the side walls through the ceiling grid.

Preferably the sleeve member is an elongate member having a length with ends and width wherein the width or diameter is selected to be greater than the diameter of a hole through the grid connection member wherein the sleeve member is hollow having an internal thread to allow the upper and lower fasteners to connect therein at each end.

Preferably the overhead fixing members are connected to link members 27, which are connected to the bracket member wherein the link members are elongate members having a length and width and the overhead fixing members have a foot portion and angled portion wherein the foot portion is fixable to the overhead structure and the angled portion is attachable to the link member.

Preferably the link member includes adjustment means to allow the length of link member to be varied.

Preferably the assembly includes two overhead fixing members and two link members.

Preferably the link member has a shape selected from a solid timber member, angle member or box section.

In a sixth aspect the invention resides in a method of installing or linking a below roof structure such as a ceiling grid support frame to an overhead structure with a bracket assembly as disclosed in the first aspect, comprising the following steps of:
  fix overhead fixing members to the overhead roof structure;
  assemble bracket members to bearing member and sleeve member to below roof structure fastener;
  fasten below roof structure fastener to the ceiling grid support frame
  fasten assembly from second step to the overhead fixing members.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

BRIEF DESCRIPTION

The invention will now be described, by way of example only, by reference to the accompanying drawings:

FIG. 1 is a schematic side view of a bracket assembly in accordance with a first preferred embodiment of the invention.

FIG. 2 is a close up perspective view of one end of the bracket assembly of FIG. 1.

FIG. 3 is a perspective view of a lower portion of the bracket assembly of FIG. 1.

FIG. 4 is a cross sectional side view of the bracket assembly of FIG. 3

FIG. 5 is an exploded perspective view of the parts of the bracket assembly of FIG. 3

FIG. 6 is a side view of the parts of the bracket assembly of FIG. 5.

FIG. 7 is a perspective view of another embodiment of the invention

FIG. 8 is a cross sectional view relating to FIG. 7

FIG. 9 is a cross section view or side elevation without the ceiling and top plate FIG. 10 is a top plan view relating to FIG. 9

FIG. 11 is a side end view or end elevation relating to FIG. 9

FIG. 12 is a side view of the ceiling bracket

FIG. 13 is an exploded perspective view of the parts of another embodiment of the bracket assembly FIG. 14 is a side view of the parts of the bracket assembly of FIG. 13.

FIG. 15 is a perspective view of the assembled parts of FIG. 13

FIG. 16 is a cross sectional view relating to FIG. 15

FIG. 17 is a perspective schematic of yet another embodiment of the bracket assembly showing a ceiling grid connection and extra arms to the bracket member to connect to an overhead structure.

FIG. 18 is a side view of the bracket assembly of FIG. 17

FIG. 19 is top plan view of the bracket assembly of FIG. 17.

DESCRIPTION OF DRAWINGS

The following description will describe the invention in relation to preferred embodiments of the invention, namely a bracket assembly 1 and method of installation as shown in FIGS. 1-19 which can used to connect between an overhead structure to a below roof structure such as a wall or ceiling grid support frame. The invention is in no way limited to these preferred embodiments as they are purely to exemplify the invention only and that possible variations and modifications would be readily apparent without departing from the scope of the invention.

The bracket assembly 1 is arranged and constructed to connect or locate or link from an overhead structure (eg roof) and be connectively supported or rested there on without significant downward loading, by a below roof or overhead structure element(s) which includes a wall structure such as a partition rather than a ceiling structure or by a ceiling structure rather than the wall structure.

As shown in FIGS. 1-6 bracket assembly 1 is adapted to be removably affixed between and to, an overhead structure 2 and wall structure 3 to provide structural integrity there between especially if the building, wall and overhead structure is meant to stay together for a limited period in a limited capacity in response to an extreme even like storms or earthquakes and not to be connected to a ceiling structure.

As seen in FIG. 1 the overhead structure 2 which can be for example a substantially horizontally oriented member comprising a floor or roof slab which includes a lower surface 4 facing a top of the wall structure 3. Wall structure 3 can be for example a partition wall comprising a horizontally mounted top plate member 7 with vertical dry wall facing panel members 8. Typically a ceiling 10 is suspended from the lower surface 4 to rest on top of an outer or top surface 12 of top plate members 7. Ceiling 10 comprises abutting panels or tiles 13 which are located and or affixed to outside surface 9 of the top plate member 7.

Wall to overhead structure bracket assembly 1 as seen in FIGS. 3-6 includes but is not limited to the following components of: an upper fastening means in the form of upper fastener 15, a bracket member 16, bearing member 18, washer member 19, sleeve member 20, spring washer 22, lower fastening means 24 in the form of a lower fastener 24. FIGS. 1 and 2 show further components of the assembly 1, which include overhead fixing members 26 and link members 27.

Figure 3:
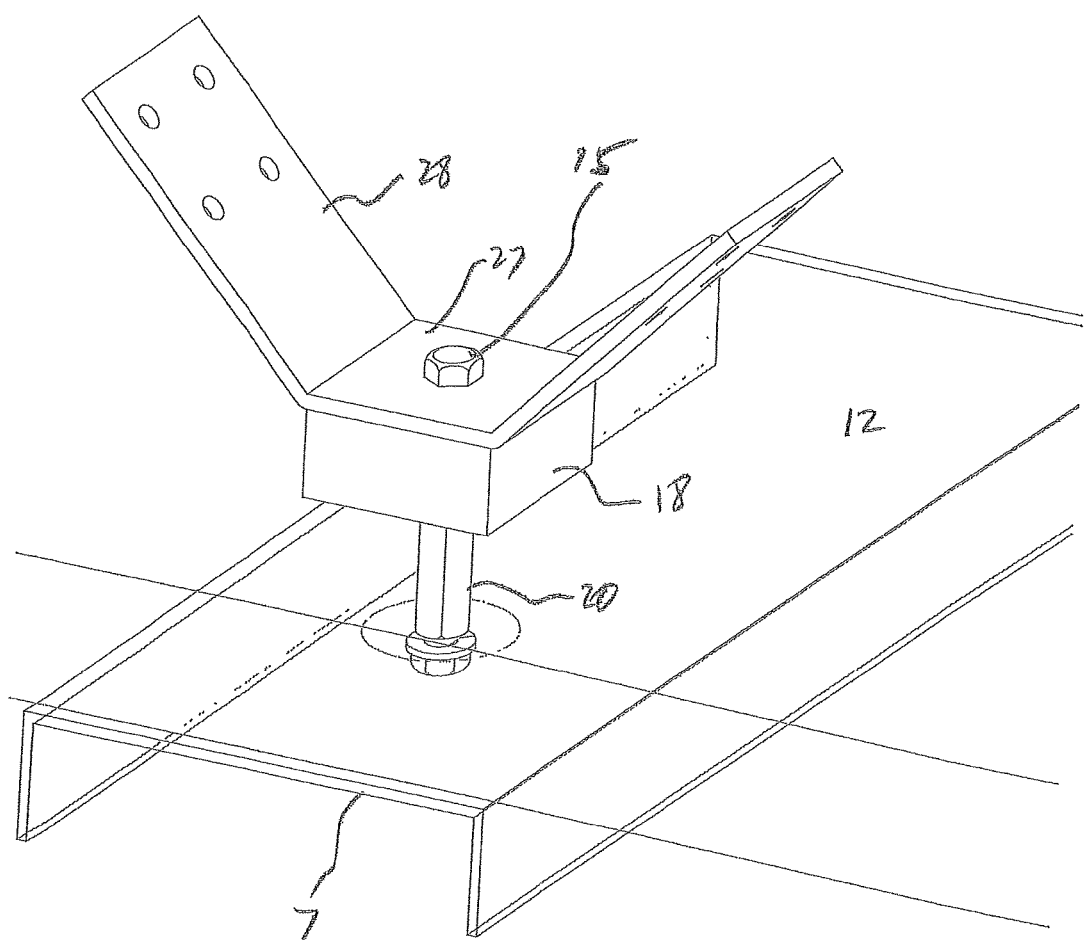

Upper and lower fasteners 15 and 24, for example can be threaded bolts which are adapted to threadingly engage with sleeve 2. Sleeve member 20 is tubular having a length with ends, with an internal thread, having the ends adapted to receive the upper and lower fasteners 15 & 24. Bracket member 16 is shaped from plate like strip member formed as a truncated V shape in cross section having a middle horizontal portion 27 with outwardly splayed wing portions 28 on each side of middle horizontal portion 27.

Bearing member 18 is cylindrically shaped with a certain diameter, which is formed of a flexible resilient material like for example rubber to allow the middle portion of the bracket member to bear and be cushioned somewhat thereon.

Overhead fixing members 26 are shaped having a foot portion 29 being horizontal in orientation when in use leading to an angled portion 30. Link members 27 are each shaped as elongate members having ends which need to structurally interconnected overhead fixing members 26 to the bracket member 16. One end is adapted to be removably connected to one angled portion 30 and the other end, to one wing portion 28. Each foot portion 29 is adapted to be affixed to lower surface 4 of overhead structure 2. In this example a fastener such as a bolt 31 can be used to fasten the foot portion 29 to the overhead structure 2.

As shown in the figures, upper fastener means 15 is located from the top, through an aperture in the middle portion 27 of bracket member 16. Underneath middle portion 27 bearing member 18 rests directly on washer member 19 which is smaller in diameter that the diameter of bearing member 18. Underneath washer 19 the sleeve member 20 is located. In this example the diameter of washer 19 is greater than a diameter of sleeve member 20. Underneath the sleeve member 20 but underneath a lower surface of the top plate member 7, there is spring washer 22 followed by lower fastener 24. In this example spring washer 22 is of smaller diameter than washer 19.

Figure 4:
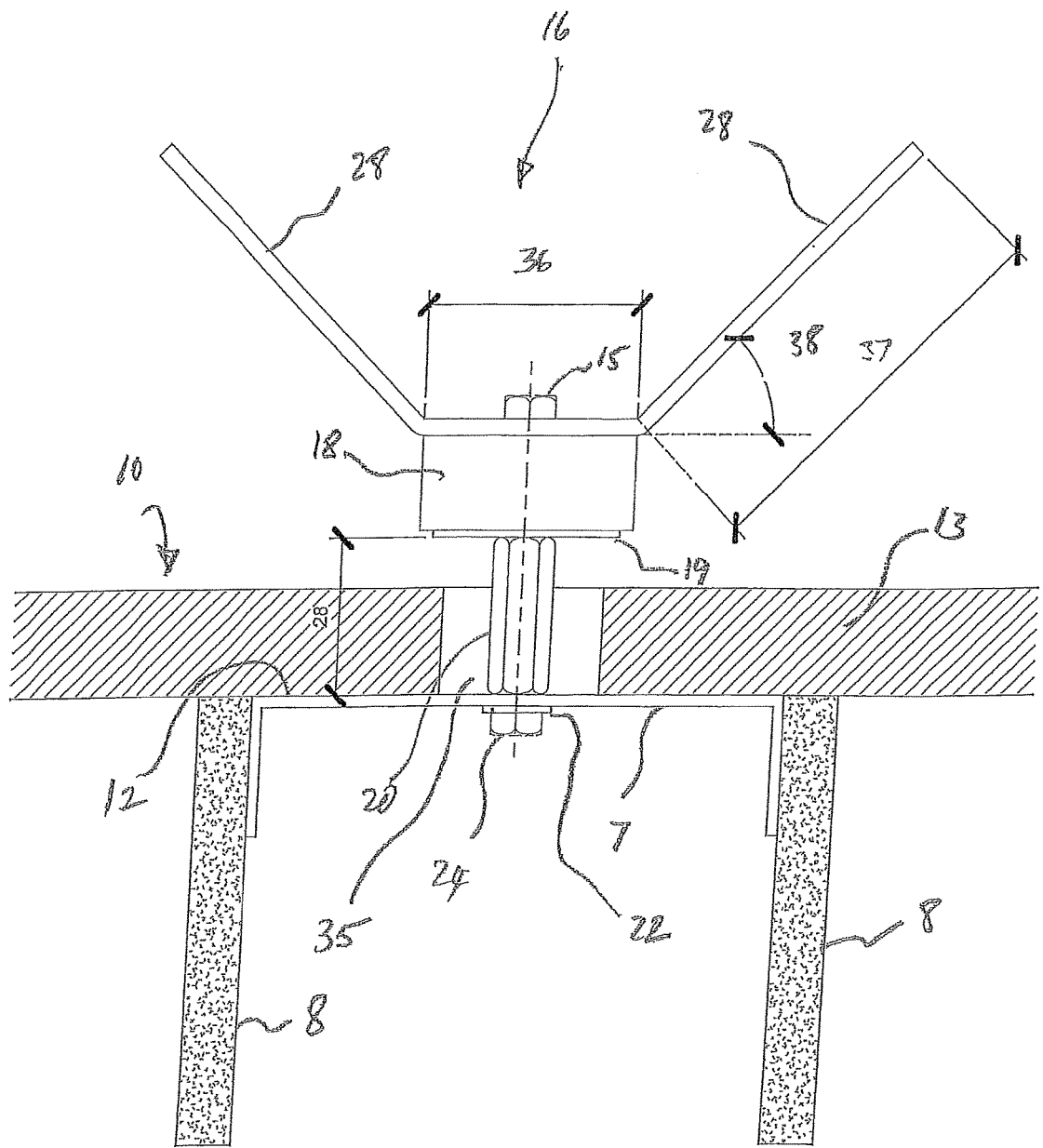
Figure 5:
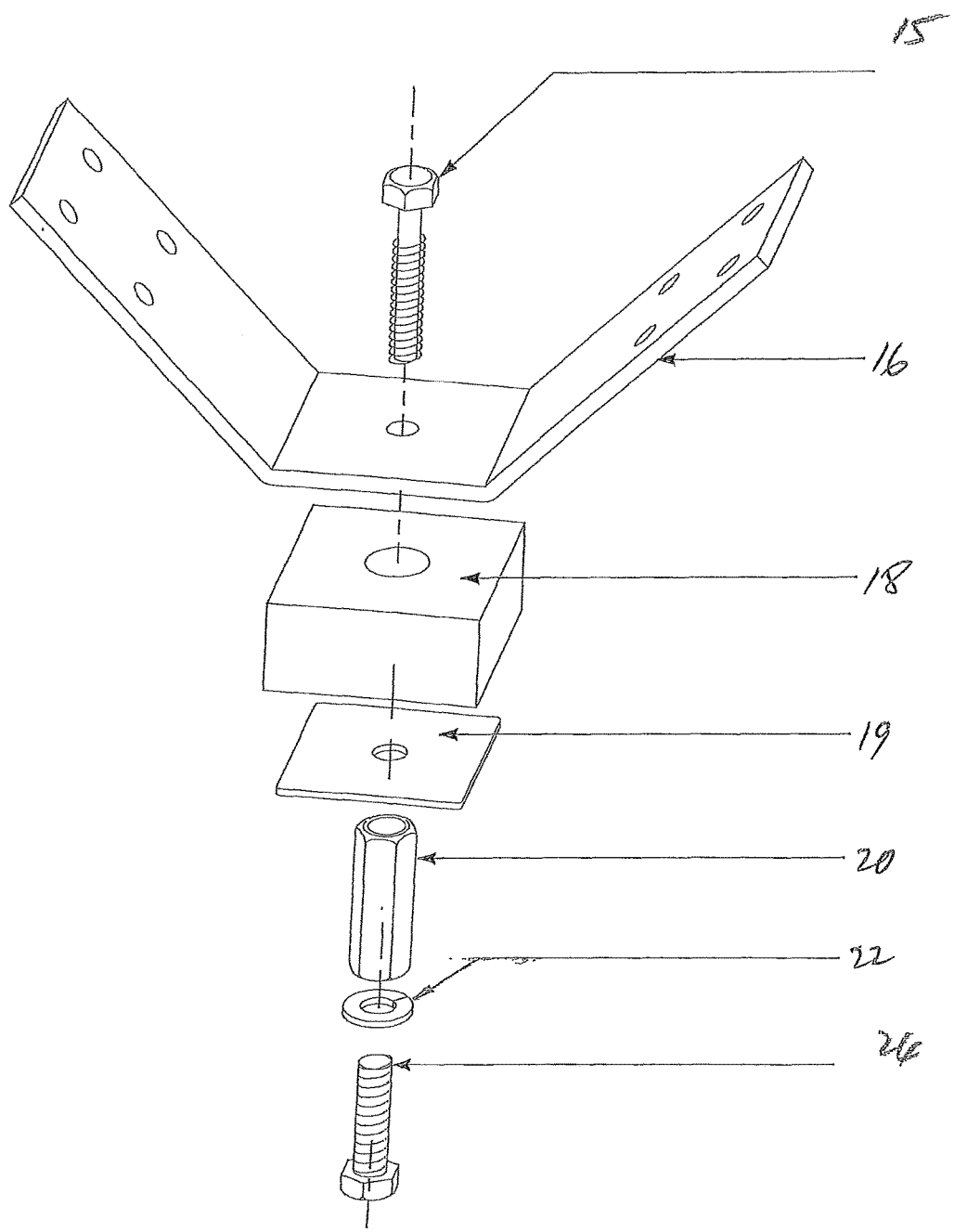
Figure 6:
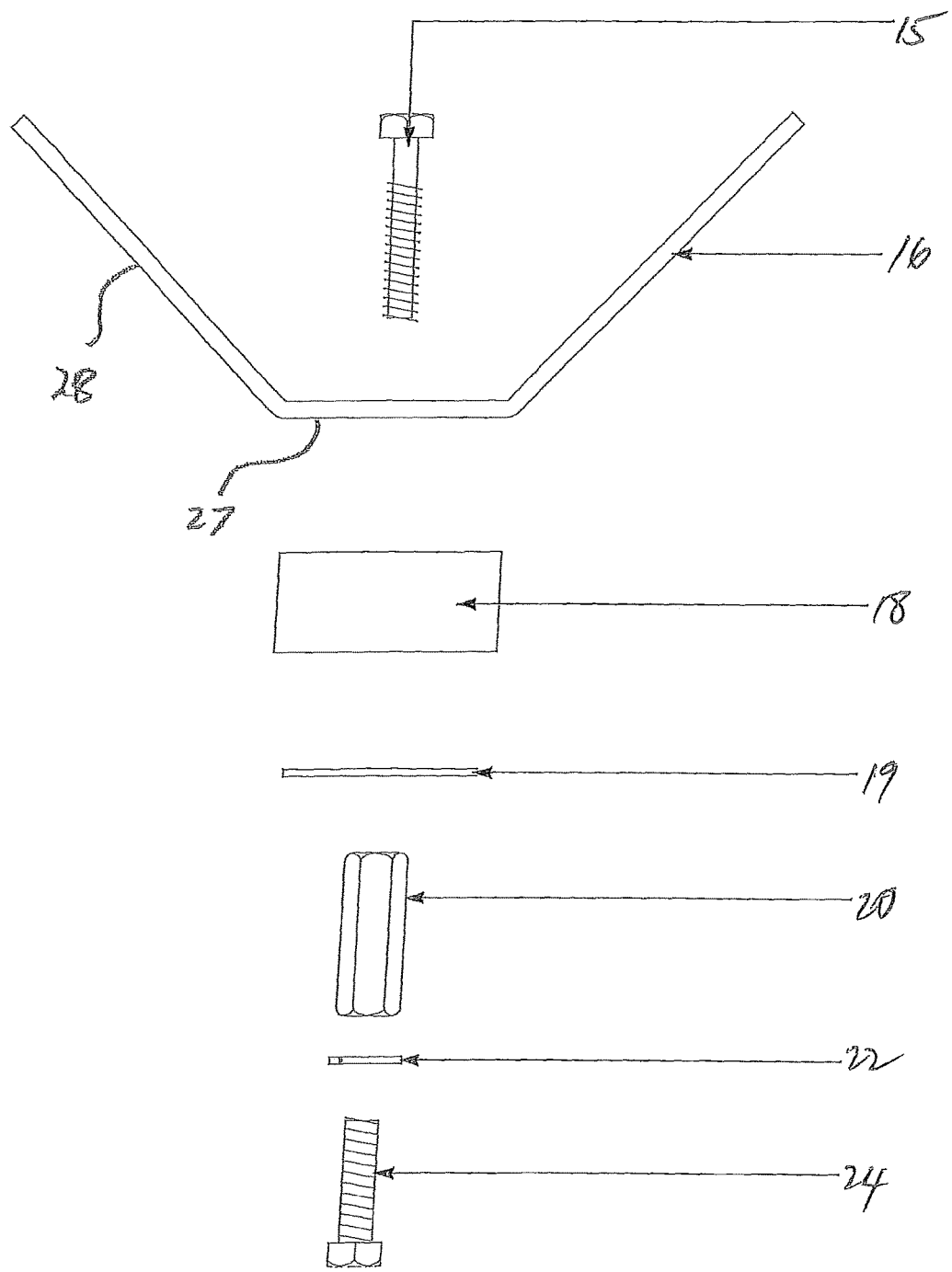
Figure 7:
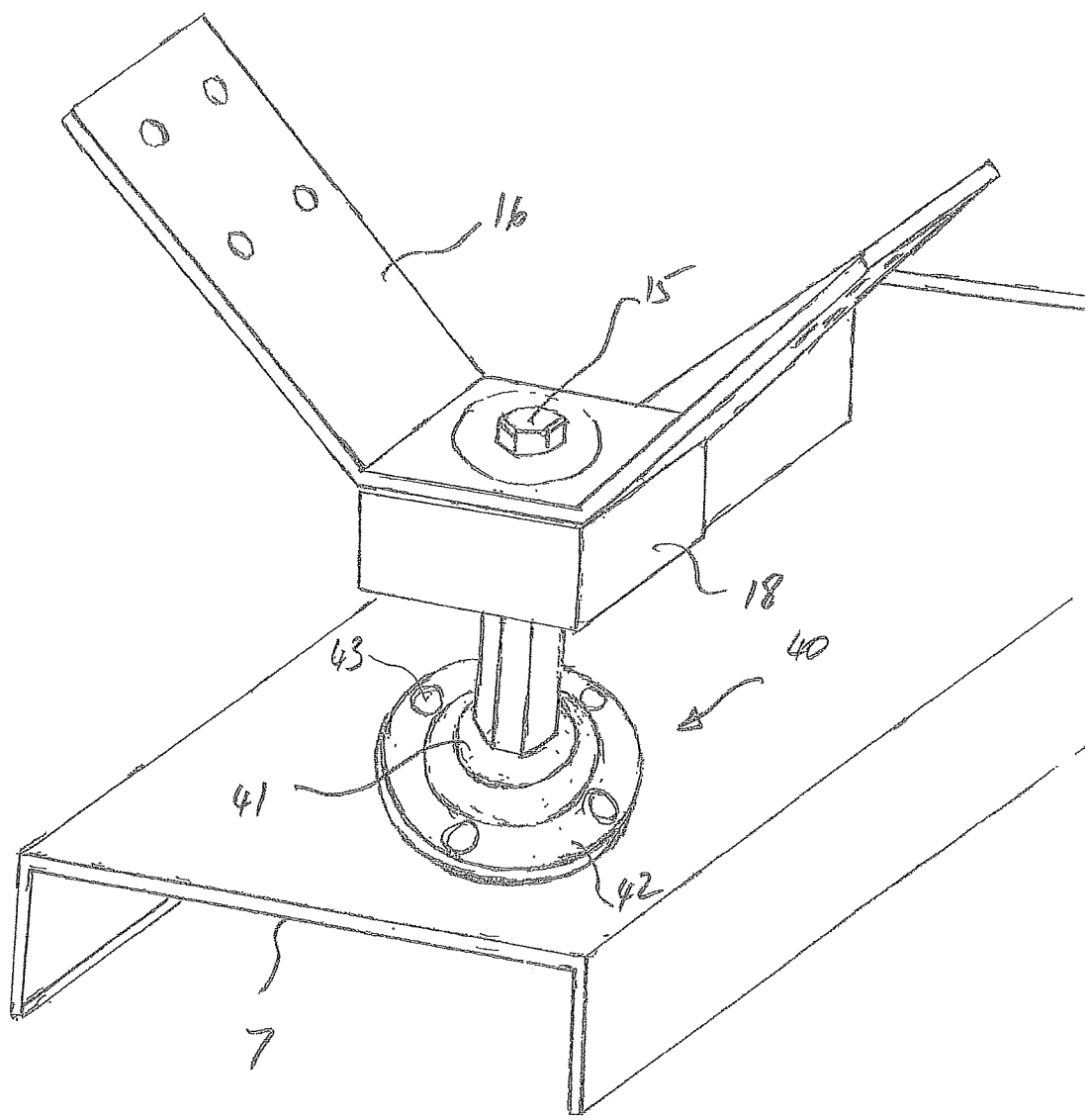
Figure 8:
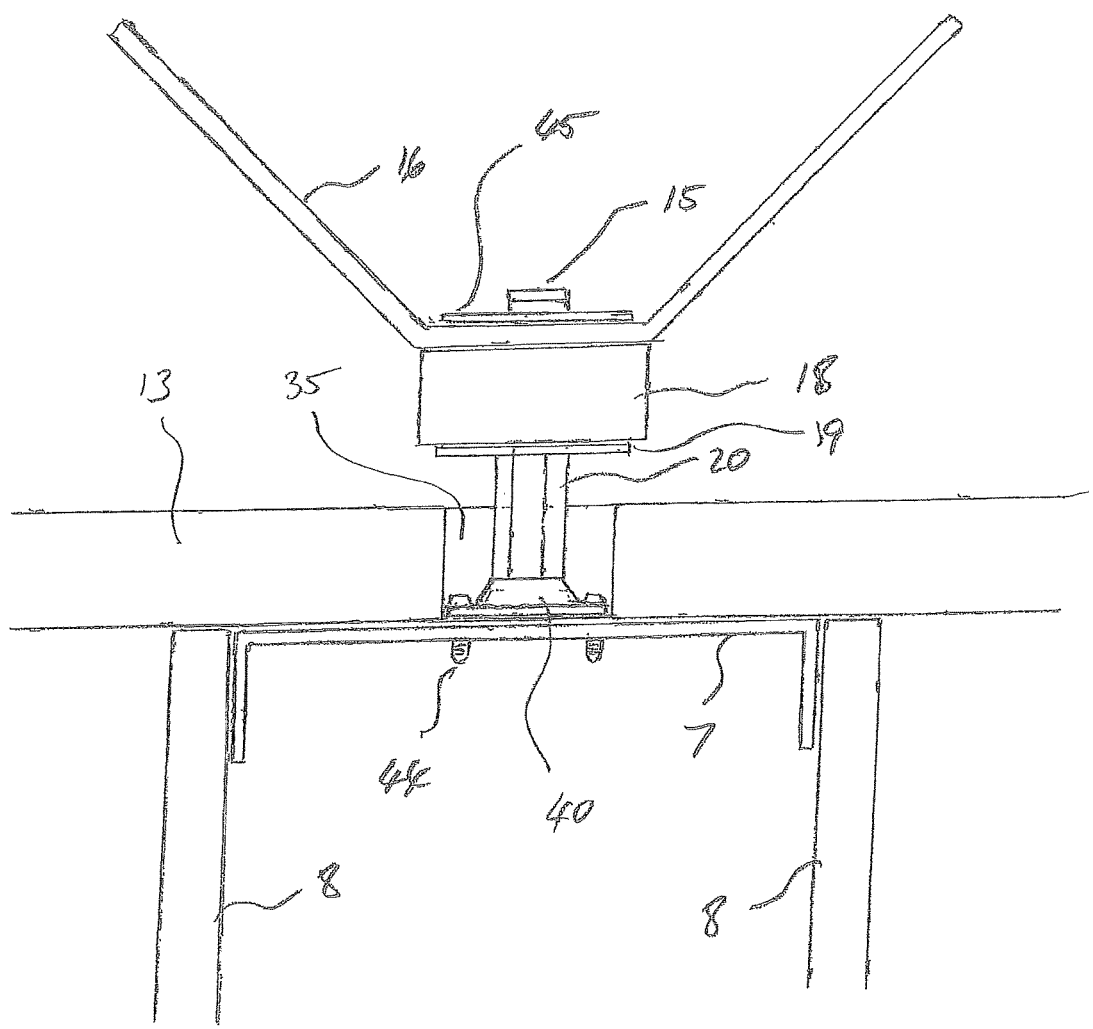
Figure 13:
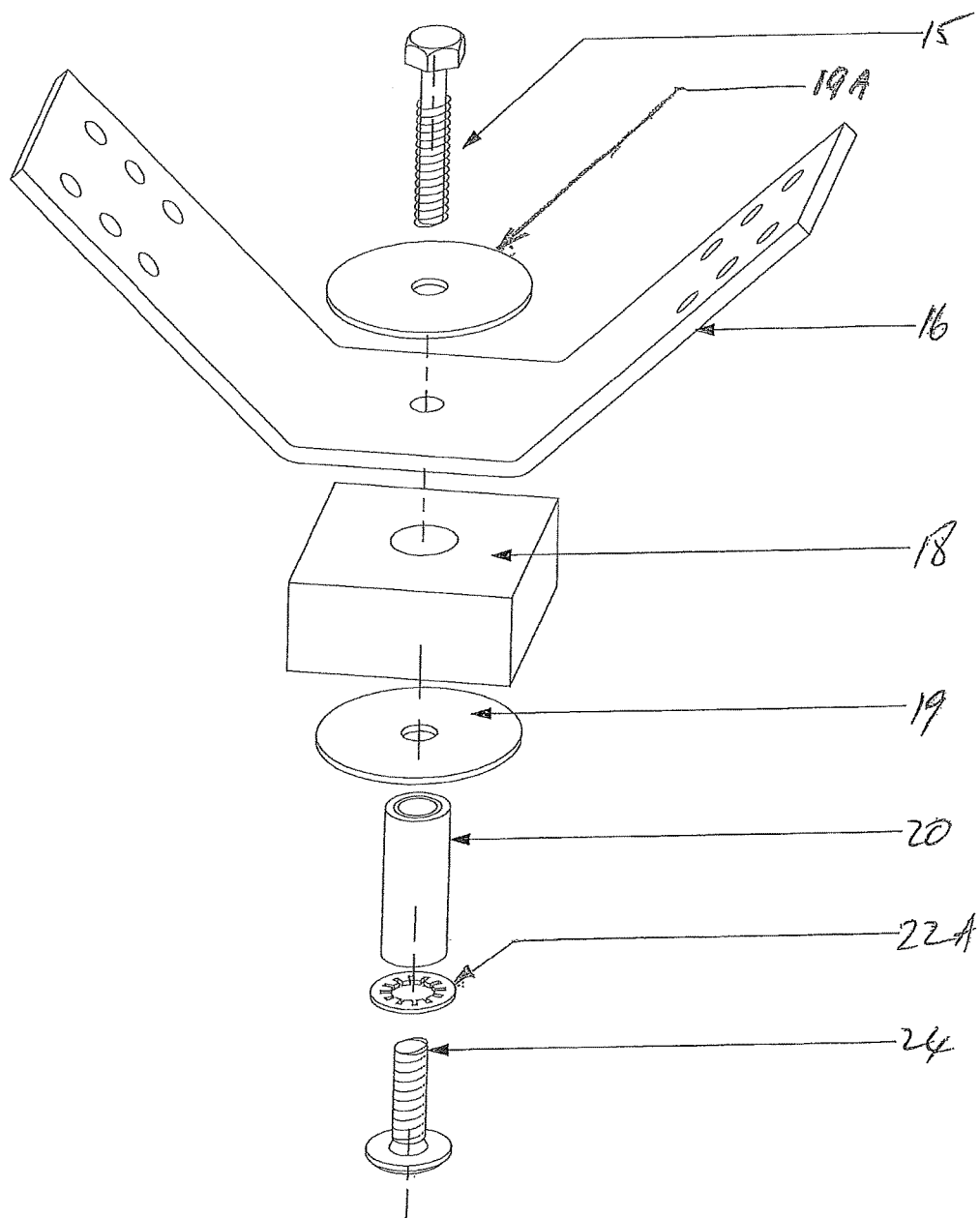
Figure 14:
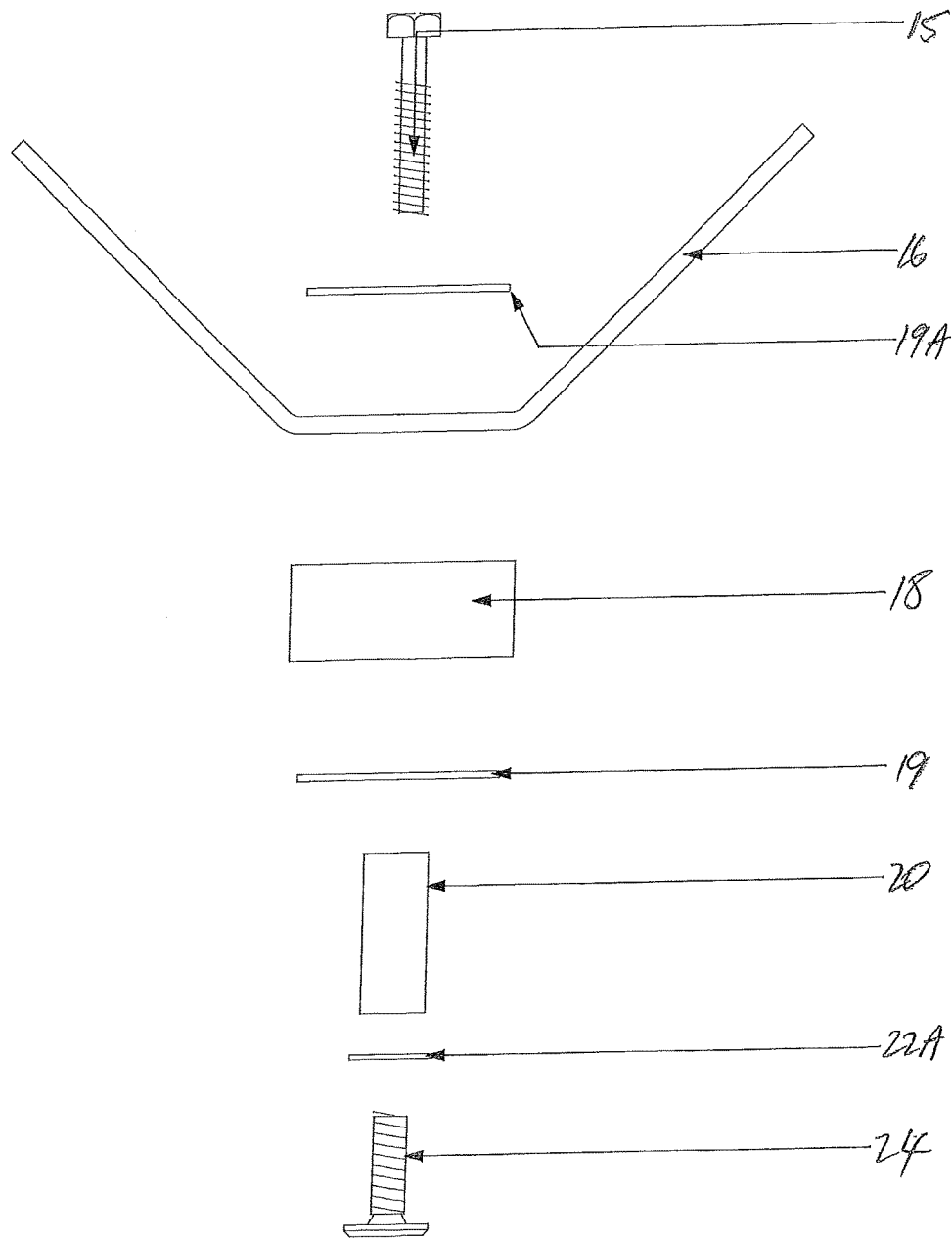
Figure 15:
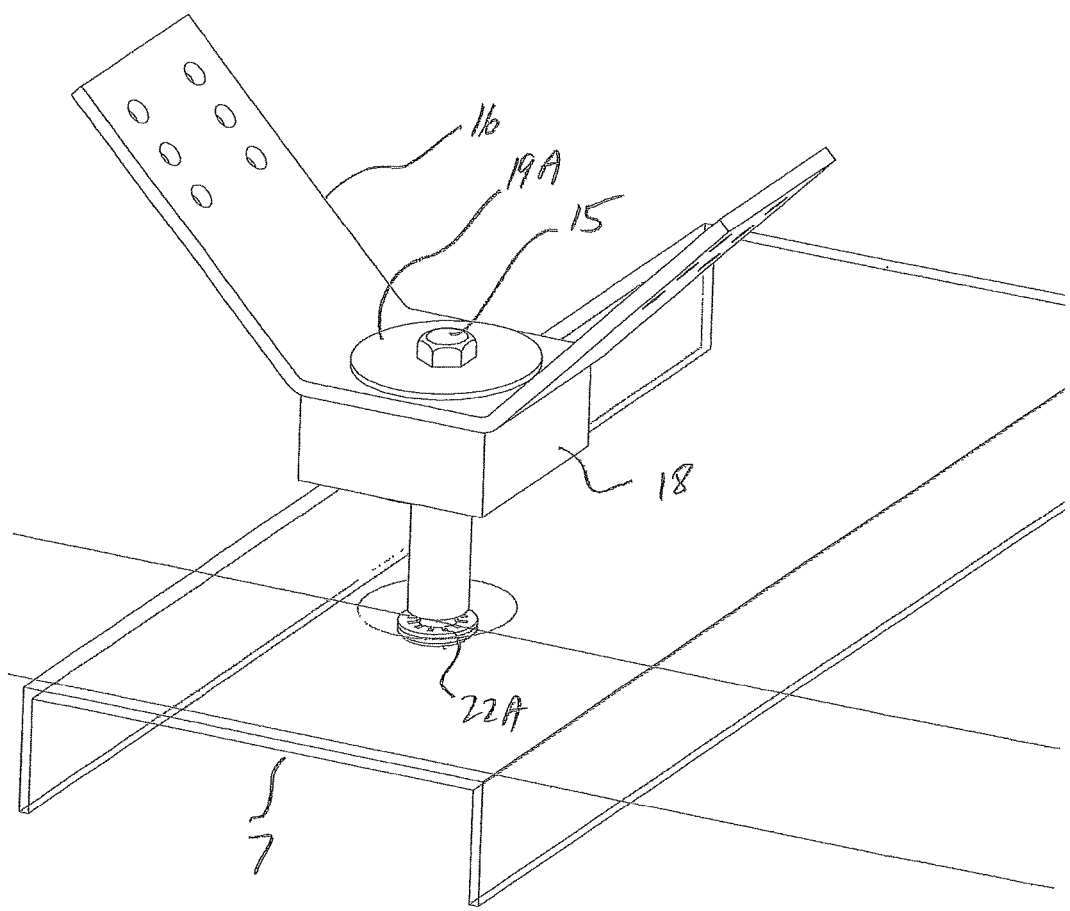
Figure 16:
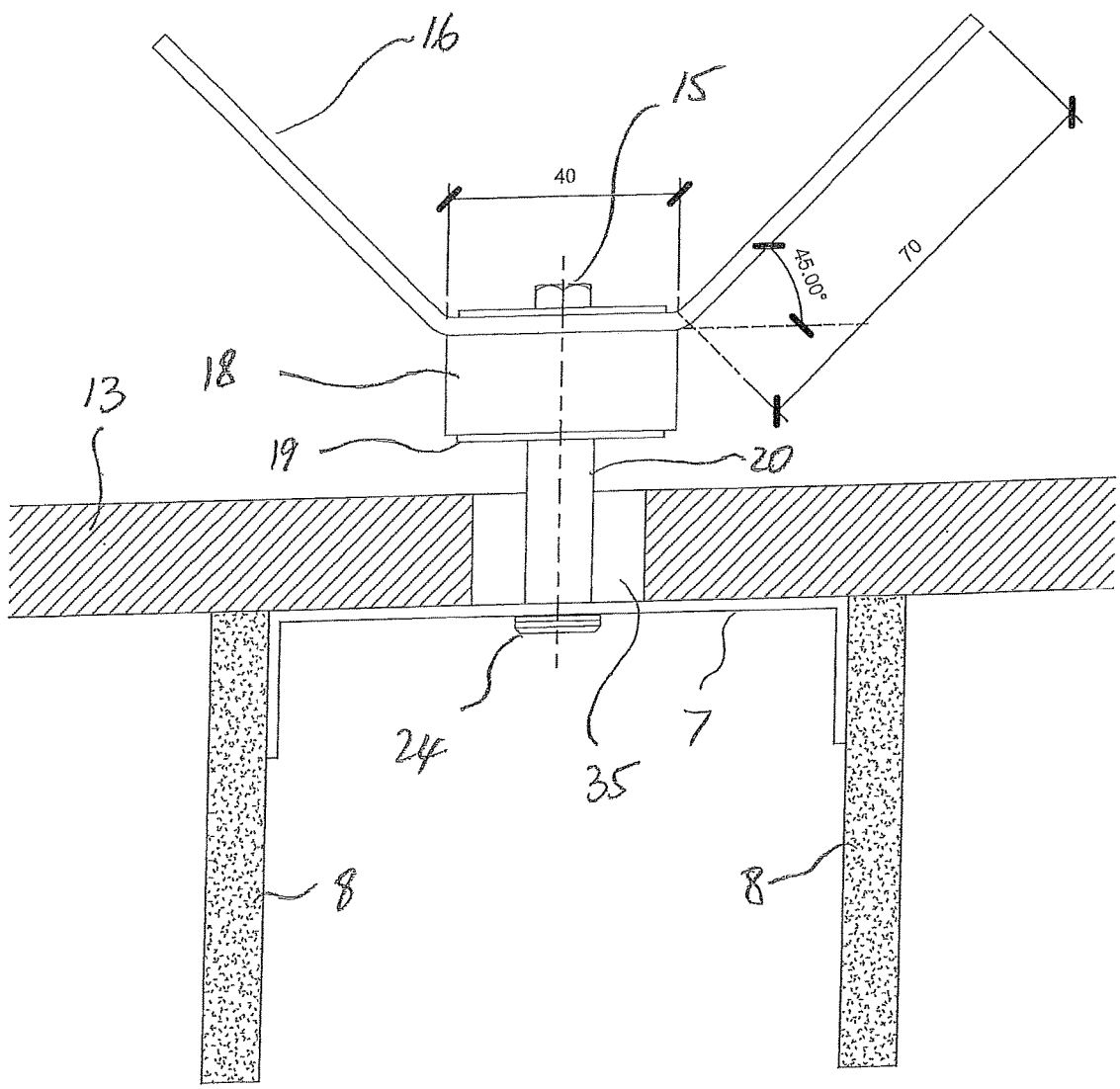

As shown in FIG. 4 for the assembly to be attached to top plate member 7, there needs to be an aperture drilled into the top plate member 7 having a diameter larger than sleeve member 20 forming a peripheral gap 35 there between. This gap 35 is designed to keep the assembly 1 separate from a ceiling structure or ceiling tiles 13. This means that the assembly 1 is affixed or connected only to the top plate member 7 and not the ceiling structure or tiles. A lower end of sleeve member 20 rests on the top of the top plate member 7 with lower fastening means 24 located underneath the top plate to upwardly protrude there through and threadingly into a lower end of sleeve member 20. The length 19 of sleeve member 20 is selected to be greater (eg 28 mm) than the thickness of ceiling tiles 13 thereby spacing or keeping the bearing member 18 and washer 19 spaced above the top surface of the ceiling tiles 13.

Overhead fixing members 26 can have at least one aperture for fixing or several apertures 26a to allow multiple fixing into lower surface 4 or to allow for different distances between overhead structure 2 to the partition or for differences in levels of the lower surface and partition.

FIGS. 7-12 relate to another embodiment of the invention where the bottom fixing is slightly different but that the other components are the same as before having the same component numbers but is designed to rest on top of and be fixed to top plate member 7. The bottom fixing now utilizes a mounting plinth member 40 which is a circular plate like member with a raised central portion 41 sloping or dropping down to an outer peripheral mounting portion 42 having apertures 43 for suitable fixing devices 44. The bottom or lower portion of the sleeve 20 rests on and/or is affixed to the central portion 41 either from fastener 15 or with a separately upwardly directed fastener. Underneath the raised central portion 41 the recessed space is designed to allow fixing to be located there within a space between the top surface of the top plate member 7 and the sleeve 20. Fixing devices 44 are downwardly inserted through apertures 43 through another aperture in top plate member 7 to poke through and be affixed if a bolt with at least one nut or if a screw they are threading engaged to the top plate member 7. An extra washer 45 is shown similar to washer 19 but placed under a head of fastener 15 abutting a top surface of bracket member 16.

FIGS. 13-16 show yet another variation as disclosed in previous drawings 1-12 especially FIG. 3, whereas this time there is a washer 19A (eg 3 mm steel washer) between bolt 15 (under its head) and an upper surface of bracket 16. Also spring washer is replaced with an internal tooth lock washer 22A. The other components of the assembly are similar to that already disclosed in this specification.

Figure 17:
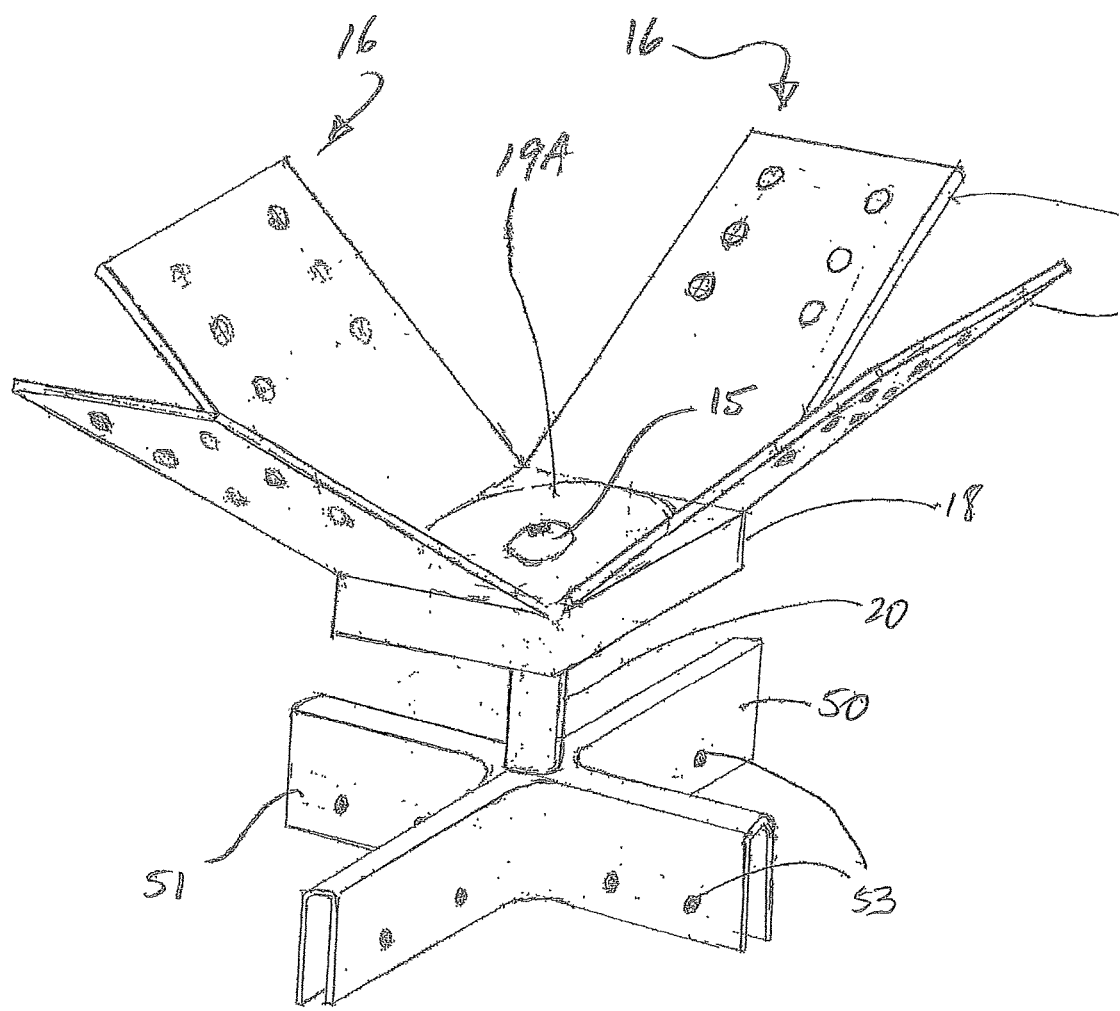
Figure 18:
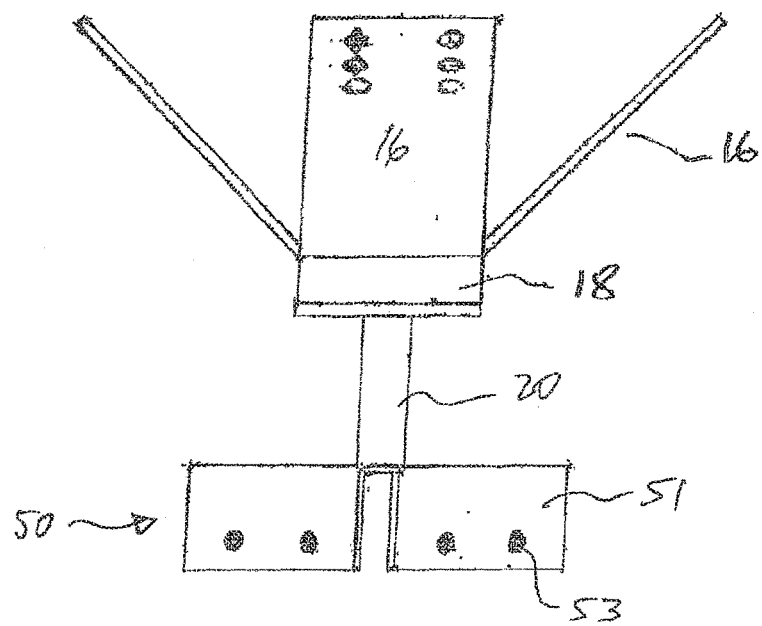
Figure 19:
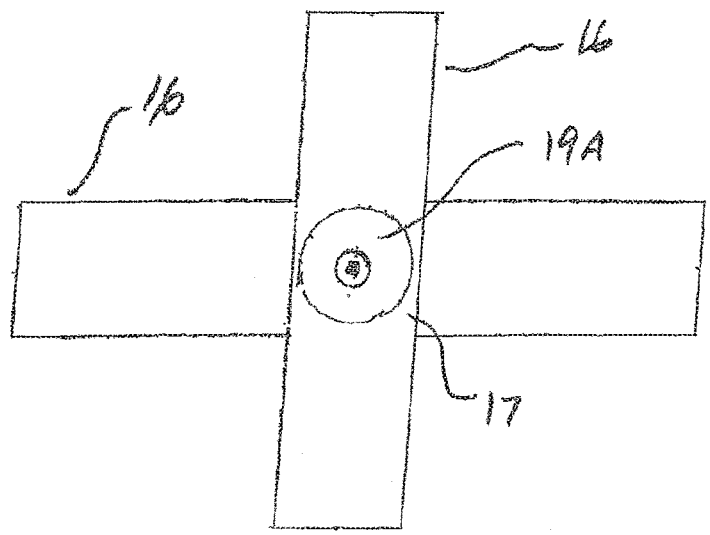

FIGS. 17-19 show a further variation in the bracket assembly 1 which is adapted to connect at its lower end instead of, to a top of a wall but to a below roof structure element which includes a ceiling grid support frame which supports ceiling tiles without being connected or singularly supported by or to the wall. The ceiling grid support frame can be hung or suspended by cable or wire to the roof or overhead structure.

This bracket assembly includes at its upper in use end, bracket member 16 having instead of being shaped from a single plate like strip member formed as a truncated V shape in cross section having a middle horizontal portion 27 with outwardly splayed wing portions 28 on each side of middle horizontal portion 27 forming a pair of opposing arms, there can be two truncated V shapes ie an second truncated V shape thereby giving in total as seen more clearly in top plan view of FIG. 19, to show four arms spaced equidistant from a central point occupied by horizontal portion 17. Similar to the single truncated V shape of the other bracket assembly, the two truncated V shape also includes central aperture for the insertion of a fastener there through.

At the lower end of the bracket assembly, there included a below roof structure fastener in the form of a ceiling grid connecting member 50 which is bolted through a bottom of ceiling grid connecting member 50 through sleeve 20 rubber block 18 upwardly to capture both bracket members 16 and washer 19A. Ceiling grid connecting member 50 is shaped of a body having a downwardly facing U cross section with side walls, being shaped to match the intersection of a top of a ceiling grid support frame such as in plan view cross shape as shown having arms 51 equally spaced from a centre. The body of the ceiling grid connecting member 50 is shaped as a cross shaped member forming a central point with aperture for the fastener to be inserted there through to fasten the below roof structure fastener to the rest of the assembly and or to the below roof structure including ceiling grid support frame.

Ceiling grid connecting member 50 can be attached to the ceiling grid support frame by fasteners extending through apertures 53 in the side walls. Other components such as overhead fixing members 26, sleeve members 20, bearing members 18, washers and link members 27 etc as previously disclosed are also included with this bracket assembly for use with a ceiling grid.

One Method of Installation
- drill hole in ceiling tile 13 of one diameter and another at least one hole of a smaller diameter in top plate member 7 to ensure the assembly does not contact a ceiling structure;
- upwardly insert lower fastener 24 with spring washer 22 to protrude there from the ceiling tile 13;
- slide down sleeve member 20 onto top of top plate member 7;
- screw lower fastener 24 into sleeve member 20;
- slide other fastener 15 downwardly through middle portion 27 of bracket 16;
- upwardly slide bearing member 18 to fastener to abut underside of middle portion 27;
- upwardly slide washer 19 onto the upper fastener 15 abutting the bearing member 18;
- screw upper fastening means 15 downwardly into protruding end of sleeve member 20;
- drill and fasten foot 29 of overhead fixing members 26 to overhead structure 2
- attach link member 27 to angled portion 30 and to wing members 28.

Another Method

In another aspect the invention resides in a method of installing or linking a wall to overhead structure with a bracket assembly as disclosed in the second aspect, comprising the following steps of:
- drill hole in ceiling tile 13 of one diameter and another hole of a smaller diameter in top plate member 7 to ensure the assembly does not contact a ceiling structure 10;
- arrange sleeve member 20 downwardly into the one diameter, followed by washer 19, followed by bearing member 18 followed by the bracket 16;
- insert and screw, a screw downwardly to attach to top plate member 7;
- drill and fasten foot 29 of overhead fixing members 26 to overhead structure 2
- attach link member 27 to angled portion 30 and to wing members 28.

Yet Another Method

In yet another aspect the invention resides in a method of installing or linking a below roof structure such as a ceiling grid support frame to an overhead structure with a bracket assembly as disclosed in the first aspect, comprising the following steps of:
- fix overhead fixing members to the overhead roof structure;
- assemble bracket members to bearing member and sleeve member to below roof structure fastener;
- fasten below roof structure fastener to the ceiling grid support frame
- fasten assembly from second step to the overhead fixing members.

Variations to these methods are also possible such as for example, firstly assembling the bracket 16 with upper fastener 15, bearing member 18, washer 19 and sleeve member 20 before upwardly screwing the lower fastener 24 with its washer 22. Additionally the method may include removing or not installing one wall lining 8 or at least part thereof, to gain access to underneath the top plate member 7 to allow for screwing a bolt/lower fastener 24 upwardly.

In the method for the ceiling grid support frame this can be varied such as for example by assembly of the bracket member with bearing member and sleeve member before fixing the overhead members or fastening to the ceiling grid support frame before fixing the overhead members.

Other variation include just using one fastener 15 to extend right through the bracket and top plate member 7 or if using a plinth member 40 as seen in FIGS. 7-12 then plinth member can be upward fastened separately by fastener 15 to a lower end of sleeve 20 and then be separately fastened downwardly to top plate member 7.

Second Method of Installation

For a retrofit situation or even a new build, instead of upper and lower fasteners 15 & 24, one can use just one fastener applied from the top by first drilling down and then screwing in a screw rather than a bolt to self fasten the assembly 1 (eg the bracket, bearing member, sleeve member and washers to the top plate member 7. For example following is such a method including the following steps of:
- drill hole in ceiling tile 13 of one diameter and another hole of a smaller diameter in top plate member 7 to ensure the assembly does not contact a ceiling structure 10;
- arrange sleeve member 20 downwardly into the one diameter, followed by washer 19, followed by bearing member 18 followed by the bracket 16;
- insert and screw, a screw downwardly to attach to top plate member 7;
- drill and fasten foot 29 of overhead fixing members 26 to overhead structure 2
- attach link member 27 to angled portion 30 and to wing members 28.

Advantages
a) Modest cost
b) Easy to install
c) Able to be adjusted
d) Simple manufacture
e) Robust construction
f) Can be torque adjusted
g) Can be adapted for many different situations
h) Can be retro-fitted or put in during construction
i) No connection or support to or from a ceiling structure
j) Can provide positive connection between wall structure and roof structure
k) Can be designed to meet certain load or structural characteristics
l) Assists in keeping wall and ceiling together during extreme events
m) Various alternative bottom fixing are possible Variations Throughout the description of this specification, the word "comprise" and variations of that word such as "comprising" and "comprises", are not intended to exclude other additives, components, integers or steps. The words "upper" and "lower" prefixing the fasteners are merely labels to indicate their in use positions and are not strictly necessary. Equally they can be called first and second. The washers 19 and 22 can be selected of any suitable size and can be as shown in the drawings as just one washer for each though any number of washers is possible.

By saying that certain structures or components of the bracket assembly "rest" or locate on another member or component is not meant to mean or imply significant 'vertical loading' but is merely meant to describe a connection which holds the components of the bracket assembly together for a certain period of time.

Bearing members 18 like the sleeve members 20 can be of any shape or length. For example bearing member 18 can be circular or square shaped of a material (eg rubber or some special plastic or possibly a biasing means like a spring) type to at least provide adequate bearing or cushioning for the load from above down to the partition. Sleeve member 20 can be for example circular or hexagonal in cross sectional shape.

Middle portion 27 can be for example 40 mm in length 36 and wing portions 28, can be 70 mm long 37 and angled 38 at 45 degrees with respect to a substantially horizontal in use plane. The angle portion 30 of overhead fixing members 26 can be angled with respect horizontal foot portion 29 to a similar angle 39 to that of the wing portion 28.

Link members 27 can be of any suitable cross section and length such as for example timber 4×2", box section, or angle etc, having means to allow connection to the overhead fixing members 26 and bracket 16 eg screws bolts or rivets or welding. Additionally link members 27 can be formed as or including means to allow adjustment or extension means. For example adjustment can include telescoping members and/or slotted members to allow appropriate extension if required.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Ceiling grid connecting member 50 of FIGS. 17-19 is shown as being in a cross shape, though other shapes are also possible depending on what grid layout is needed to be connected thereto. Ceiling grid connecting member 50 can be formed of any suitable material such as pressed metal and can be attached to the ceiling grid by any suitable mans such as for example, bolting, riveting, screwing, friction fitting, clipped or welded.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

For purposes of the description hereinafter, the terms "upper", "lower", "right", "left", "vertical", "horizontal", "top", "bottom", "lateral", "longitudinal", "side", "front", "rear" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

What we claim is:

1. A bracket assembly for connecting or linking an overhead roof structure to below roof structure elements of a building, the below roof structure elements including a wall having a top plate member or ceiling support structure, the bracket assembly comprising overhead fixing members, a bracket member, bearing member, sleeve member, and below roof structure fastener, being interconnected and fastened together wherein one end of the bracket member is connectable to the overhead fixing members to the overhead roof structure and the other end of the bracket member is connectable to below roof structure fastener which is connectable to the below roof structure, with the bearing member and sleeve member being located and connected between the bracket member and the below roof structure such that the bracket member rests without loading on the bearing member which then rests on the sleeve member which when in use rests without loading on the below roof structure, being adapted to provide structural integrity between the below roof structure and overhead structure.

2. The bracket assembly as claimed in claim 1 wherein the below roof structure includes a wall having a top plate member, the sleeve member spaces the bearing member from the top plate member and wherein the bracket member is a truncated V shape in cross section.

3. The bracket assembly as claimed in claim 2 wherein at least one fastener is applied from a top of the bracket member to connect to the top plate member to hold and connect in between, a bracket member, bearing member, washer, and sleeve member.

4. The bracket assembly as claimed in claim 3 wherein the at least one fastener abuts a mounting plinth member having a central raised portion with a central aperture and an outer periphery mounting portion whereby a lower end of the sleeve rests on the central raised portion and the periphery portion is fastened to the top plate member.

5. The bracket assembly as claimed in claim 3 wherein there are upper and lower fasteners whereby the upper fastener connects the bracket member to the bearing member and sleeve member, and the lower fastener connects the sleeve member to the top plate member.

6. The bracket assembly as claimed in claim 3 wherein the sleeve member is an elongate member having a length with ends and width wherein the width is selected to be less than a diameter of a hole made through the ceiling tile but greater than the diameter of a hole through the top plate member wherein the sleeve member is hollow having an internal thread to allow the upper and lower fasteners to connect therein at each end.

7. The bracket assembly as claimed in claim 6 wherein the overhead fixing members are connected to link members 27, which are connected to the bracket member wherein the link members are elongate members having a length and width and the overhead fixing members have a foot portion and angled portion wherein the foot portion is fixable to the overhead structure and the angled portion is attachable to the link member and the link member includes adjustment means to allow the length of link member to be varied and the assembly includes two overhead fixing members and two link members.

8. The bracket assembly as claimed in claim 7 wherein the link member has a shape selected from a solid timber member, angle member or box section and the upper and lower fastening means include bolt members.

9. The bracket assembly as claimed in claim 8 wherein the bracket and overhead fixing members are formed of elongate plate like members.

10. The bracket assembly as claimed in claim 1 wherein the below roof structure includes a ceiling support structure having a ceiling grid support frame suspended from the overhead roof structure with ceiling tiles supported on or by the ceiling grid support frame.

11. The bracket assembly as claimed in claim 10 wherein, the sleeve member spaces the bearing member from the below roof structure fastener and below roof structure.

12. The bracket assembly as claimed in claim 11 wherein the bracket member comprises a truncated V shape body in cross section wherein there are two bodies forming a cross shape in plan view.

13. The bracket assembly as claimed in claim 12 wherein at least one fastener is applied from a top of the bracket member to connect to the below roof structure fastener to hold and connect in between, a bracket member, bearing member, washer, and sleeve member.

14. The bracket assembly as claimed in claim 13 wherein the below roof structure fastener includes a ceiling ceiling grid connecting member having a body comprising an elongate member having a U shaped cross section with side walls, sized and adapted to downwardly slide over at least a portion of a ceiling grid support frame and be fastened thereto through the side walls and to part of the ceiling grid support frame.

15. The bracket assembly as claimed in claim 14 wherein the body of the below roof structure fastener is shaped as a cross shaped member forming a central point with aperture for the fastener to be inserted there through to fasten the below roof structure fastener to the rest of the bracket assembly.

16. The bracket assembly as claimed in claim 15 wherein the sleeve member is an upright elongate member having a length with ends and width wherein the width is selected to be greater than the diameter of a hole through the below roof structure wherein the sleeve member is hollow having an internal thread to allow upper and lower fasteners to connect therein at each end.

17. The bracket assembly as claimed in claim 16 wherein the overhead fixing members are connected to link members 27, which are connected to the bracket member wherein the link members are elongate members having a length and width and the overhead fixing members have a foot portion and angled portion wherein the foot portion is fixable to the overhead structure and the angled portion is attachable to the link member.

18. The bracket assembly as claimed in claim 17 wherein the link member includes adjustment means to allow the length of link member to be varied and the assembly includes two overhead fixing members and two link members and the link member has a shape selected from a solid timber member, angle member or box section.

19. A method of installing or linking a wall to overhead structure with a bracket assembly as claimed in claim 1, comprising the following steps of:
    drilling hole in ceiling tile 13 of one diameter and another hole of a smaller diameter in top plate member 7 to ensure the assembly does not contact a ceiling structure;
    upwardly inserting lower fastener 24 with spring washer 22 to protrude there from the ceiling tile 13;
    sliding down sleeve member 20 onto top of top plate member 7;
    screw lower fastener 24 into sleeve member 20;
    sliding upper fastener 15 downwardly through middle portion 27 of bracket 16;
    upwardly sliding bearing member 18 to fastener to abut underside of middle portion 27;
    upwardly sliding washer 19 onto upper fastener 15 abutting the bearing member 18;
    screw upper fastener 15 downwardly into protruding end of sleeve member 20;
    drilling and fastening foot 29 of overhead fixing members 26 to overhead structure 2
    attaching link member 27 to angled portion 30 and to wing members 28.

20. A method of installing or linking a wall to overhead structure with a bracket assembly as claimed in claim 1, comprising the following steps of:
    drill hole in ceiling tile 13 of one diameter and another hole of a smaller diameter in top plate member 7 to ensure the assembly does not contact a ceiling structure 10;
    arrange sleeve member 20 downwardly into the one diameter, followed by washer 19, followed by bearing member 18 followed by the bracket 16;
    insert and screw, a screw downwardly to attach to top plate member 7;
    drill and fasten foot 29 of overhead fixing members 26 to overhead structure 2
    attach link member 27 to angled portion 30 and to wing members 28.

21. A method of installing or linking a below roof structure such as a ceiling grid support frame to an overhead structure with a bracket assembly as claimed in claim 1, comprising the following steps of:
    fix overhead fixing members to the overhead roof structure;
    assemble bracket members to bearing member and sleeve member to below roof structure fastener;
    fasten below roof structure fastener to the ceiling grid support frame fasten assembly from second step to the overhead fixing members.

\* \* \* \* \*